United States Patent
Fujiyoshi et al.

(10) Patent No.: US 8,873,259 B2
(45) Date of Patent: Oct. 28, 2014

(54) DC-DC CONVERTER INCLUDING REGENERATION SNUBBER CIRCUIT

(75) Inventors: Toshikazu Fujiyoshi, Osaka (JP); Hajime Katsushima, Osaka (JP); Kenji Morimoto, Osaka (JP); Satoshi Yamamura, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 448 days.

(21) Appl. No.: 12/680,240

(22) PCT Filed: Feb. 25, 2009

(86) PCT No.: PCT/JP2009/053361
§ 371 (c)(1),
(2), (4) Date: Mar. 26, 2010

(87) PCT Pub. No.: WO2010/067629
PCT Pub. Date: Jun. 17, 2010

(65) Prior Publication Data
US 2011/0280048 A1   Nov. 17, 2011

(30) Foreign Application Priority Data
Dec. 12, 2008  (WO) .................. PCT/JP2008/072671

(51) Int. Cl.
*H02H 7/122*  (2006.01)
*H02M 1/34*  (2007.01)
*H02M 3/335*  (2006.01)

(52) U.S. Cl.
CPC ............ *H02M 3/33569* (2013.01); *H02M 1/34* (2013.01); *H02M 2001/342* (2013.01); *Y02B 70/1491* (2013.01)
USPC .................................... 363/56.12; 363/21.06

(58) Field of Classification Search
USPC .......... 363/21.04–21.05, 21.12–21.13, 21.16, 363/56.08, 56.11–56.12, 109
See application file for complete search history.

(56) References Cited

U.S. PATENT DOCUMENTS

| 5,077,651 A | * | 12/1991 | Kobayashi et al. | ........ 363/56.05 |
| 5,331,533 A | * | 7/1994 | Smith | .............................. 363/20 |

(Continued)

FOREIGN PATENT DOCUMENTS

| JP | 04-236165 A | 8/1992 |
| JP | 04236165 A | * 8/1992 |

(Continued)

OTHER PUBLICATIONS

International Search Report for corresponding Application No. PCT/JP2009/053361 mailed May 26, 2009 in English (previously submitted with application on Mar. 26, 2010 in Japanese language).

(Continued)

*Primary Examiner* — Adolf Berhane
*Assistant Examiner* — Henry Lee, III
(74) *Attorney, Agent, or Firm* — Renner, Otto, Boisselle & Sklar, LLP

(57) ABSTRACT

A DC-DC converter includes a regeneration snubber circuit. The snubber circuit is connected in parallel with the secondary diode circuit and includes a series circuit of a discharge blocking diode, a snubber capacitor, and a switching element for regeneration connected in parallel with the discharge blocking diode. The DC-DC converter further includes a control unit which turns the switching element for regeneration on a predetermined time period after the timing of turning the primary side switching element off. The predetermined time period is set to approximately the time period during which the charge, accumulated in the snubber capacitor due to reverse recovery time when one of the secondary diodes has been turned off, discharges.

7 Claims, 5 Drawing Sheets

(56) References Cited

U.S. PATENT DOCUMENTS

| | | | |
|---|---|---|---|
| 6,532,160 B2 * | 3/2003 | Hirokawa et al. | 363/52 |
| 6,980,447 B1 * | 12/2005 | Schaible et al. | 363/56.05 |
| 2005/0259451 A1 * | 11/2005 | Mbaye | 363/40 |
| 2006/0226816 A1 * | 10/2006 | Wai et al. | 323/222 |

FOREIGN PATENT DOCUMENTS

| | | |
|---|---|---|
| JP | 2003-189618 A | 7/2003 |
| JP | 2004-364456 A | 12/2004 |
| JP | 2005-027394 A | 1/2005 |
| JP | 2006-191708 A | 7/2006 |
| JP | 2008-079403 A | 4/2008 |

OTHER PUBLICATIONS

International Search Report for corresponding Application No. PCT/JP2009/053361 mailed May 26, 2009.

* cited by examiner

DC-DC CONVERTER INCLUDING REGENERATION SNUBBER CIRCUIT

TECHNICAL FIELD

The present invention relates to a DC-DC converter circuit which is provided with a secondary side snubber circuit.

BACKGROUND ART

A DC-DC converter circuit is provided with a switching circuit which is a primary side switching element and which switches a DC power supply, with a transformer to whose primary side winding the output of said switching circuit is supplied and which outputs at its secondary side winding a voltage which has been changed by a predetermined voltage change ratio, and a secondary diode for current adjustment which is connected to the secondary side winding of said transformer. Having been rectified by the secondary diode, the output is supplied to a load after being smoothed.

However since, when it is turned off, due to accumulated carriers, the secondary diode has a time period trr in which it can conduct current (this time period is termed the reverse recovery time, or the recovery time), accordingly a through current flows in the secondary winding of the transformer during this reverse recovery time, and, due to this, there is the problem that a surge voltage is applied to the rectification element when it has been turned off.

Thus, in order to eliminate this surge voltage, a DC-DC converter circuit has been proposed in which a CR snubber circuit is connected to the secondary side winding.
patent document #1: Japanese Laid-Open Patent Publication 2008-79403;
patent document #2: Japanese Laid-Open Patent Publication 2003-189618.

DISCLOSURE OF INVENTION

Problems to be Solved by the Invention

However, since all of the above described prior art DC-DC converter circuits are ones which incorporate resistance elements such as snubber resistors or the like, accordingly the charge in the snubber capacitor is consumed by the resistance element as heat, and there is the problem that the overall efficiency is reduced.

The object of the present invention is to provide a DC-DC converter circuit with which the efficiency is enhanced, due to the charge in the snubber capacitor provided to the secondary side winding being regenerated to the load.

Means for Solving Problem

The DC-DC converter circuit according to the present invention includes: a switching circuit which switches a DC power supply with a primary side switching element; a transformer, to a primary side winding of which the output of said switching circuit is applied, and which outputs a voltage which has been changed by a predetermined voltage change ratio to a secondary side winding; a secondary diode circuit including a secondary diode for current adjustment, connected to said secondary side winding of said transformer; and a series circuit of a smoothing reactor and a smoothing capacitor, connected between rectification outputs of said secondary diode circuit.

Moreover, this DC-DC converter circuit includes: a regeneration snubber circuit connected in parallel with said secondary diode circuit, and including a series circuit of a discharge blocking diode and a snubber capacitor, and a switching element for regeneration connected in parallel with said discharge blocking diode; and a control unit which turns said switching element for regeneration ON a predetermined time period after the timing of turning said primary side switching element OFF.

This predetermined time period is set to approximately the time period during which the charge, accumulated in said snubber capacitor due to reverse recovery time when any one of said secondary diodes in said secondary diode circuit has been turned OFF, discharges.

The switching circuit may be a switching circuit of any of the following types: the push pull type, the full bridge type, and the half bridge type. With the present invention, the switching element for regeneration which is included in the regeneration snubber circuit connected in parallel with said secondary diode circuit is turned to ON for approximately the period in which charge, which has accumulated in said snubber capacitor due to reverse recovery time when a secondary diode has been turned OFF, discharges. Due to this, it is arranged for the energy which is accumulated in the leakage inductance due to the through current component flowing through the secondary winding when a secondary diode is turned OFF to charge up the snubber capacitor, so that it is possible to prevent any surge voltage being applied to the secondary diodes. Moreover, the change accumulated in the snubber capacitor is regenerated to the load when the switching element for regeneration is turned ON, and is thus regenerated to the load without being consumed as heat by any resistor.

Effects of the Invention

Since, according to this invention, the energy which is accumulated in the leakage inductance due to the through current component flowing in the secondary winding when the secondary diode is turned off is regenerated to the load, accordingly no surge voltage is applied to the secondary diode, and moreover the efficiency is enhanced, since there is no heat loss.

BEST MODE FOR CARRYING OUT THE INVENTION

Figure 1:
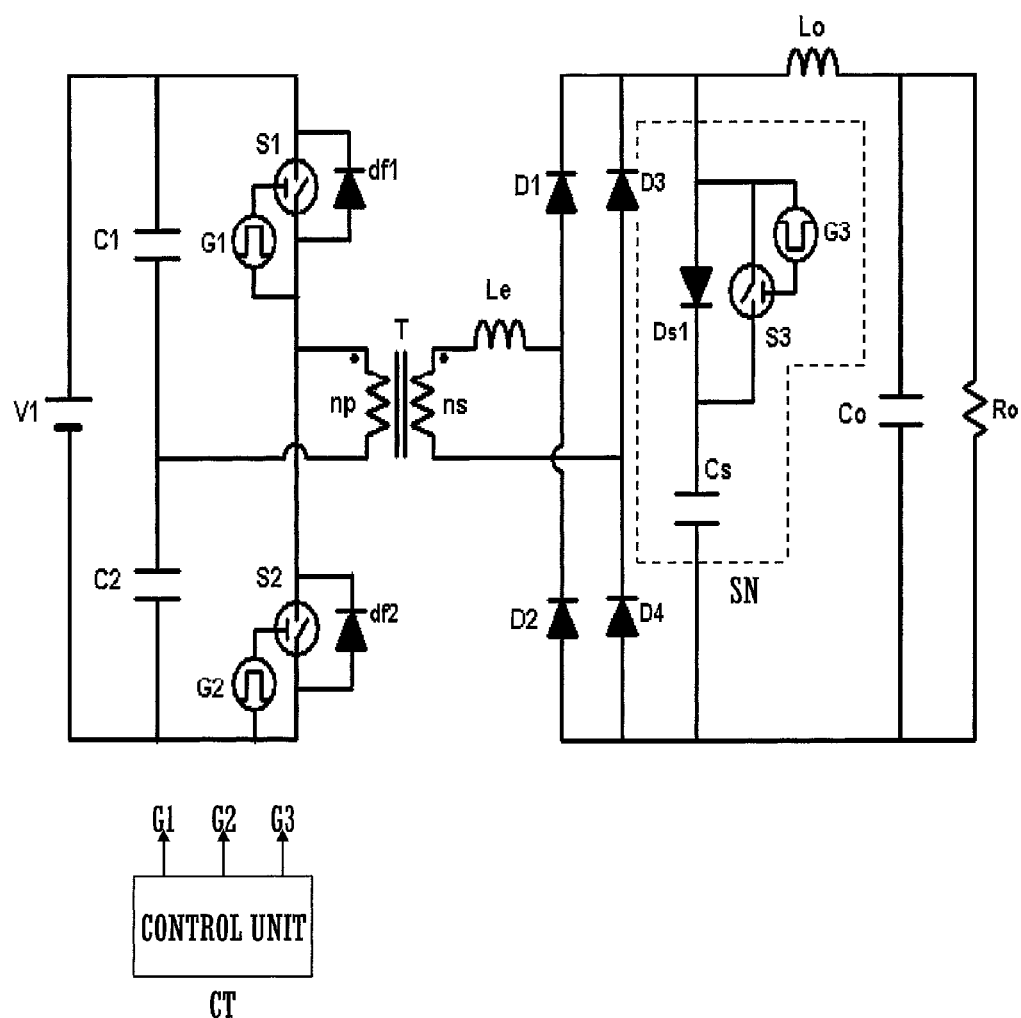
FIG. 1 is a circuit diagram of a DC-DC converter circuit which is an embodiment of the present invention.

FIG. 1 is a circuit diagram of a DC-DC converter circuit which is an embodiment of the present invention.

A series circuit of a first capacitor C1 and a second capacitor C2, which constitutes a voltage source, is connected in parallel with a DC power supply V1, and primary side switching elements, in other words a first switching element S1 and a second switching element S2, are each connected in parallel to these capacitors C1 and C2. Each of these switching elements S1 and S2 is a semiconductor switching element, and may, for example, be an IGBT (insulation gate type bipolar transistor) or a MOS-FET. A primary winding np of a transformer T is connected between the point of connection between the capacitors C1 and C2 and the point of connection between the switching elements S1 and S2. Respective free wheel diodes (clamp diodes) df1 and df2 are connected in reverse parallel to the switching elements S1 and S2. Moreover a control unit CT is provided, which outputs respective control signals G1 and G2 to control terminals of the switching elements S1 and S2 for alternatingly turning these switching elements S1 and S2 ON and OFF, on either side of inactive intervals.

As described above, the primary side of this DC-DC converter is built as a half bridge type inverter circuit.

The secondary side of this DC-DC converter has the following structure.

A secondary diode circuit which includes secondary diodes D1 through D4 connected as a bridge for current adjustment is connected to a secondary winding ns of the transformer T, and a filter circuit which consists of a series circuit of a smoothing reactor $L_0$ and a smoothing capacitor $C_0$ is connected between the rectification outputs of these secondary diodes D1 through D4. This filter circuit could also consist only of the smoothing reactor L0. Moreover, a regeneration snubber circuit SN is connected between the rectification outputs of the secondary diodes D1 through D4, and includes a series circuit of a discharge blocking diode Ds1 and a snubber capacitor Cs, and a switching element S3 for regeneration which is connected in parallel with said discharge blocking diode Ds. In other words, this regeneration snubber circuit SN is connected in parallel to a first secondary diode circuit which consists of the series circuit (via the secondary winding ns) of the secondary diodes D1 and D4, and to a second secondary diode circuit which consists of the series circuit (via the secondary winding ns) of the secondary diodes D2 and D3. The switching element S3 for regeneration may, for example, consist of a MOS-FET. A control signal G3 from the control unit CT is inputted to a control terminal of the switching element for regeneration S3.

Next, the operation of the DC-DC converter circuit described above will be explained.

Figure 2:
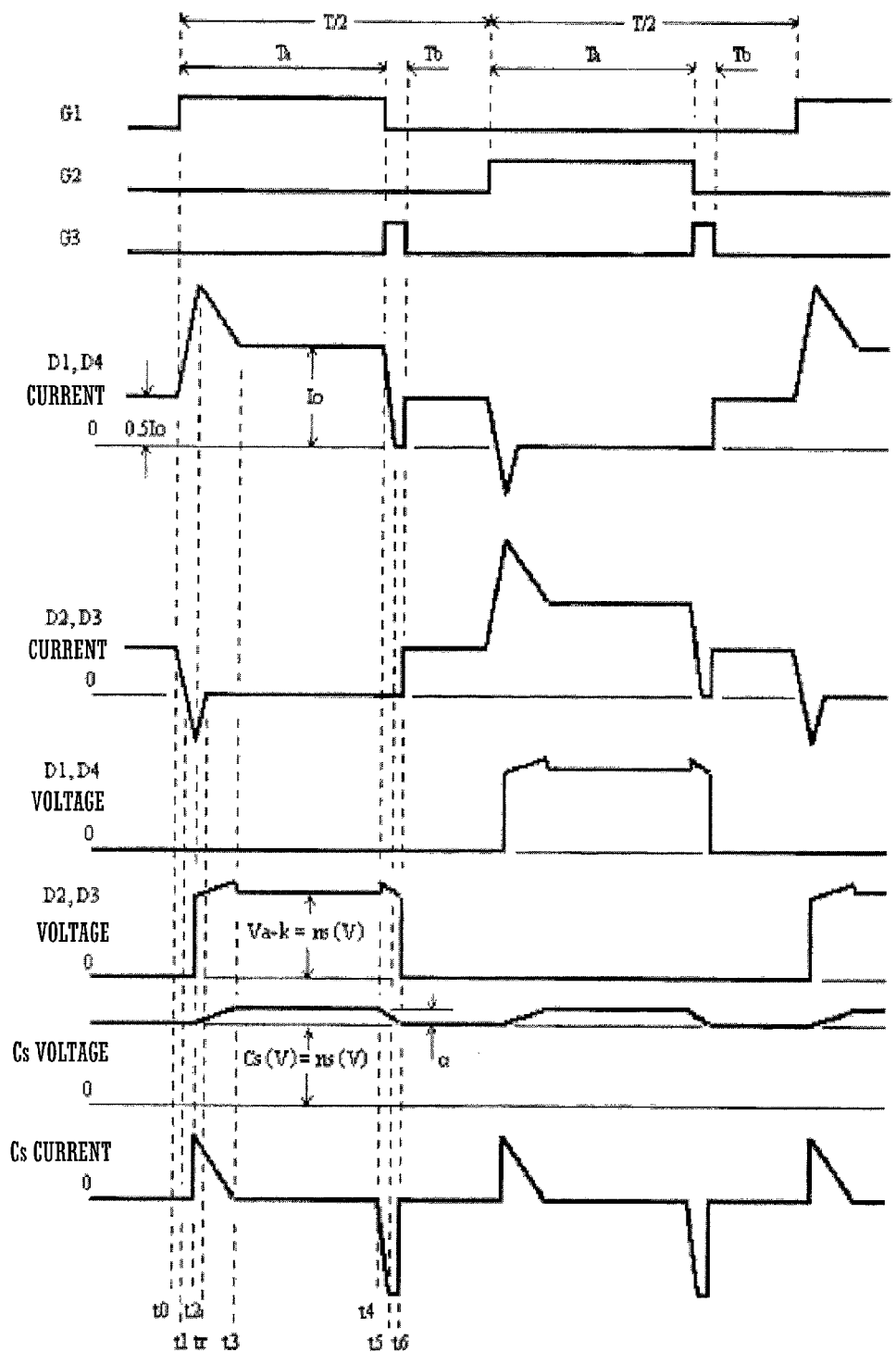
FIG. 2 is a time chart for this DC-DC converter circuit.

FIG. 2 is a time chart.

Before t0, the control signals G1 and G2 are not outputted, and due to this both the switching elements S1 and S2 are OFF. At this time the reactor $L_0$ on the secondary side is the source of current, and half of the output current $I_0$ flows in each of the rectification diodes D1 through D4 (the free wheeling state).

At t0, when the switching element S1 is turned ON in synchronization with the control signal G1, ns (V)=Vin×ns/np (numbers of windings) is generated in the secondary winding ns of the transformer T, and the current in the diodes D1 and D4 starts to increase. Vin is the input voltage to the primary winding np. Because a leakage inductance Le is present between the primary and the secondary of the transformer T, the rate of increase ΔI of this current is:

$$\Delta I = ns(V) \times \Delta t / Le$$

Accordingly, the current which flows in the diodes D1 and D4 is:

$$0.5I_0 + \Delta I = 0.5I_0 + ns(V) \times \Delta t / Le$$

On the other hand, the current in the diodes D2 and D3 starts to decrease, and the value of this current is $0.5 I_0 - ns(V) \times \Delta t / Le$ At t1, the current in the diodes D1 and D4 becomes $I_0$ and the current in the diodes D2 and D3 becomes zero, and they go into the cutoff state and the current changeover terminates.

However, with regard to the diodes D2 and D3 which are to go to OFF, due to the reverse recovery time t1~tr (trr), during the interval t1 to t2, the current in the diodes D1 and D4 increases, and the current in the diodes D2 and D3 progressively decreases to be less than zero. The fact that the current in the diodes D2 and D3 progressively decreases to be less than zero is because current flows in reverse from the cathodes to the anodes, so that a shunt current (through current) flows in all of the diodes D1 through D4; and, due thereto, energy is accumulated in the leakage inductance Le. With prior art circuitry, during the interval t2 to tr, when the diodes D2 and D3 start to recover their reverse recovery capability, a spike shaped induced voltage (i.e. a surge voltage) is generated, which greatly exceeds the maximum reverse withstand voltage (Vrrm) of the diodes.

With the DC-DC converter of this embodiment, the above described induced voltage is absorbed after t2 by the snubber capacitor Cs.

When the induced voltage is generated, during the interval t2 to t3, a charging current flows to the snubber capacitor Cs via the discharge blocking diode Ds1, and, due thereto, the voltage across the capacitor Cs increases by α. Let us suppose that, when the above described induced voltage is not present, the reference voltage of the snubber capacitor Cs is Cs (V)=ns (V); then the voltage Cs (V) of the capacitor Cs when it is charged becomes Cs (V)=ns (V), and the voltage of the diodes D2 and D3 is clamped to approximately flat, rather than having a spike shape.

In this manner, due to the reverse recovery time characteristic trr of the diodes D2 and D3, a shunt current (through current) flows in all of the diodes D1 through D4 during the interval t1 to t2, so that, when the reverse blocking capability of the diodes D2 and D3 starts to recover during the interval t2 to tr, an induced voltage is generated in the leakage inductance Le. However, this induced voltage is absorbed by the snubber capacitor Cs during the interval t2 to t3, and due to this the voltage of the diodes D2 and D3 is clamped to approximately flat, rather than having a spike shape.

At tr, the current in the diodes D2 and D3 becomes zero, and at t3 the current in the diodes D1 and D4 becomes $I_0$.

At t4 the control signal G3 goes to ON, and the switching element S3 for regeneration goes to ON. When this switching element S3 goes to ON, the charge in the snubber capacitor Cs starts to be discharged via the switching element S3. The ON interval Tb of the control signal G3 is set so that, at this time, the amount of discharge becomes equal to the amount of increase α. In other words, the interval Tb is set so that (charge current amount/cycle)=(discharge current amount/cycle) holds. As a result, during discharge, at t6 where the control signal G3 goes to OFF, the voltage Cs (V) drops to:

$$Cs(V) = ns(V) + \alpha - \alpha = ns(V)$$

This discharge time period is within the free wheel interval when both of the switching elements S1 and S2 are OFF, and, due to this, the discharge current becomes a portion of the output current $I_0$ which is a constant current discharge taking the reactor $L_0$ as a current source. Accordingly, the discharge current is regenerated to the load.

Although the charging and discharging of the snubber capacitor Cs is performed each ½ cycle of the switching cycle in this embodiment, when the discharge amount is extremely small, the accuracy of the synchronization interval Tb becomes a problem, because the time interval Tb over which the regeneration switch S3 is ON is extremely short. Thus, in this case, as another embodiment, it would also be acceptable to perform the discharge cycle once in several cycles. By doing this it is possible for the amount of discharge each time to be greater, and therefore it is possible to set the time interval Tb over which the regeneration switch S3 is ON to be long, so that the accuracy does not become a problem.

The behavior during the interval Tb when the control signal G3 is ON is as follows.

Since before t4 the switching element S1 is ON, accordingly energy is accumulated in the leakage inductance Le by the output current $I_0$; but, when t4 arrives, this energy is emitted via the diodes D1 and D4. Due to this, the output current $I_0$ is divided between a current which flows through the diodes D1 and D4 on the basis of this emitted energy, and the discharge current from the snubber capacitor Cs.

Since at t5 the current in the diodes D1 and D4 becomes zero and the cutoff state is reached, accordingly, in the interval t5 through t6, the output current $I_0$ is only the discharge current of the snubber capacitor Cs.

At t6 an amount a of the discharge of the snubber capacitor Cs is completed, and the regeneration switching element S3 goes to OFF. When the regeneration switching element S3 goes to OFF, the output current $I_0$ is divided so as to flow to the series circuit of the diodes D1 and D4 and to the series circuit of the diodes D2 and D3, and, as a result, $0.5I_0$ flows in each of the diodes D1 through D4. Cs (V) is applied to the regeneration switching element S3 until the discharge of the snubber capacitor Cs ends and it starts to be charged up for a second time.

By the above, the operation of one T/2 period cycle is completed, and thereafter the switching element S2 is turned ON in synchronization with the control signal S2, and the operation of the next T/2 period cycle is performed in a similar manner to that described above.

Furthermore, in a different embodiment, the ON time period Tb of the control signal may be controlled to be a bit shorter. Due to this, it is possible to reduce the amount of discharge of the snubber capacitor Cs. When this is done, the amount of charging also decreases, since the voltage of the snubber capacitor Cs rises. If this is done, it is possible to reduce the currents flowing in the switching element S3, the secondary diodes D1 through D4, and the discharge element diode Ds1. Moreover, pulsation of the voltage of the snubber capacitor Cs is reduced.

In other words, the voltage of the snubber capacitor Cs assumes a state in which its charging amount and its discharge amount are balanced. For example although, when the output current has been increased, the amount of discharge increases and the voltage of the snubber capacitor Cs tends to decrease, since the amount of charging increases due to this voltage decrease, accordingly the voltage of the snubber capacitor Cs is restored to its value which has been determined by the ON time period of the switching element S3. Thus, even if the load condition changes, the operation is such that the voltage of the snubber capacitor Cs becomes approximately constant.

Figure 3:
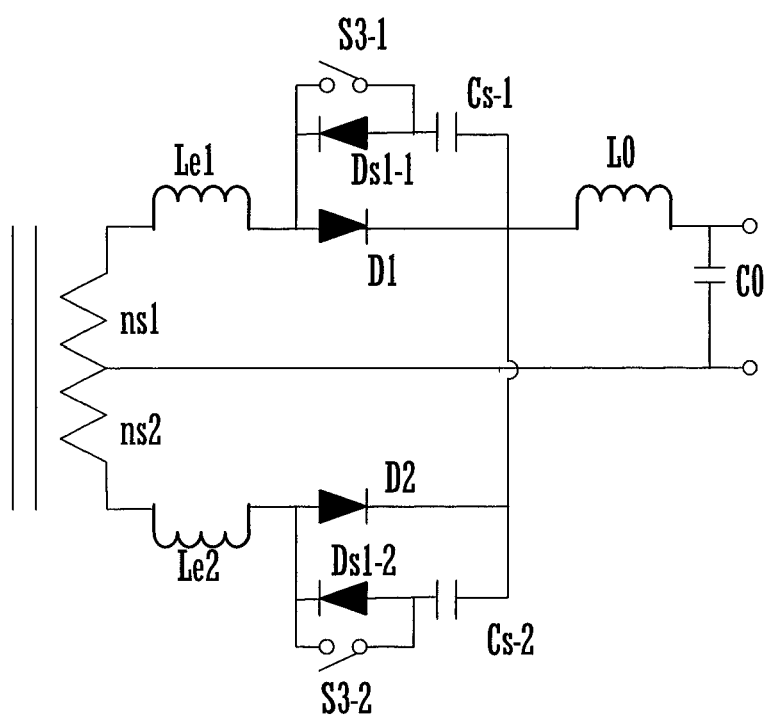
FIG. 3 is a circuit diagram of a DC-DC converter circuit which is another embodiment of the present invention.

FIG. 3 is a circuit diagram of a DC-DC converter circuit which is another embodiment of the present invention.

With this DC-DC converter, two output terminals and a center tap are provided to the secondary side winding of the transformer T. The first secondary diode D1 and the second secondary diode D2 for two phase half wave current adjustment are connected to the two output terminals respectively, while the load is connected between the output side of a reactor $L_0$ which is connected to the cathode side terminals of the secondary diodes D1 and D2, and the center tap of the transformer T. A first regeneration snubber circuit is connected between A-K of the secondary diode D1 (i.e. between its anode and cathode), in other words in parallel with this secondary diode D1, and a second regeneration snubber circuit is connected between A-K of the secondary diode D2 (i.e. between its anode and cathode), in other words in parallel with this secondary diode D2. The first regeneration snubber circuit consists of a series circuit of a first discharge blocking diode Ds1-1 and a first snubber capacitor Cs-1, and a first switching element S3-1 for regeneration which is connected in parallel with the first discharge blocking diode Ds1-1. And the second regeneration snubber circuit consists of a series circuit of a second discharge blocking diode Ds1-2 and a second snubber capacitor Cs-2, and a second switching element S3-2 for regeneration which is connected in parallel with the second discharge blocking diode Ds1-2.

A control unit (not shown in the figures) turns the primary side switching elements S1 and S2 alternately ON and OFF within one cycle. And, in synchronization with turning the primary side switching element S1 OFF, this control unit turns the second regeneration switching element S3-2 to OFF for just a predetermined time interval Tb from this OFF timing. Moreover, in synchronization with turning the primary side switching element S2 OFF, the control unit turns the first regeneration switching element S3-1 to ON for just the predetermined time interval Tb from this OFF timing.

Due to the reverse recovery time trr of the secondary diode D2 directly after the first switching element S1 is turned ON (corresponding to the interval t1 to tr in FIG. 2), although energy is accumulated in the leakage inductance Le1+Le2 which consists of the series connection of the leakage inductances Le1 and Le2, the induced voltage due to this energy is absorbed in the second snubber capacitor Cs-2 (corresponding to the interval t2 to t3 in FIG. 2). Thereafter, from the timing at which the first switching element S1 is turned OFF, the second switching element S3-2 for regeneration is turned ON for just the interval Tb. The time interval Tb is set to the time period in which the charge which has been charged into the snubber capacitor Cs-2, and which originates in the reverse recovery time trr when the secondary diode D2 was turned OFF, discharges. Due to this, the charge which was accumulated in the snubber capacitor Cs-2 is all discharged in this time interval Tb.

The above operation is performed within the front half ½ cycle.

And the same operation as that described above is also performed within the rear half ½ cycle. In other words, due to the reverse recovery time trr of the secondary diode D1 directly after the second switching element S2 is turned ON (corresponding to the interval t1 to tr in FIG. 2), although energy is accumulated in the leakage inductances Le1+Le2 which consists of the series connection of the leakage inductance Le1 and Le2, the induced voltage due to this energy is absorbed in the first snubber capacitor Cs-1 (corresponding to the interval t2 to t3 in FIG. 2). Thereafter, from the timing at which the second switching element S2 is turned OFF, the first switching element S3-1 for regeneration is turned ON for just the interval Tb. The time interval Tb is set to the time period in which the charge which has been charged into the snubber capacitor Cs-1, and which originates in the reverse recovery time trr when the secondary diode D1 was turned OFF, discharges. Due to this, the charge which was accumulated in the snubber capacitor Cs-1 is all discharged in this time interval Tb FIG. 4 is a circuit diagram of a DC-DC converter circuit which is yet another embodiment of the present invention.

The way in which this DC-DC converter differs from the converter of FIG. 3 is that it is arranged for only one snubber capacitor to be used, and for it to be possible to use this snubber capacitor Cs in common in both the first regeneration snubber circuit and also the second regeneration snubber circuit. In other words it is arranged for it to be possible to utilize the snubber capacitor Cs in common in both of the regeneration snubber circuits, by connecting together the anode of the first discharge blocking diode Ds1-1 of the first regeneration snubber circuit and the anode of the second discharge blocking diode Ds1-2 of the second regeneration snubber circuit, and by connecting the snubber capacitor Cs to this connection point. The operation of this converter is the same as the operation of the converter shown in FIG. 3 and described above.

Figure 5:
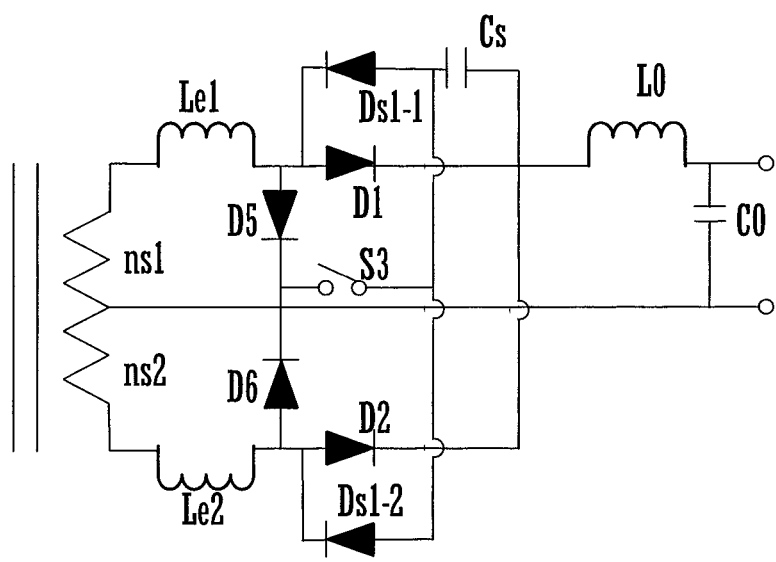
FIG. 5 is a circuit diagram of a DC-DC converter circuit which is still another embodiment of the present invention.

FIG. 5 is a circuit diagram of a DC-DC converter circuit which is still another embodiment of the present invention.

Figure 4:
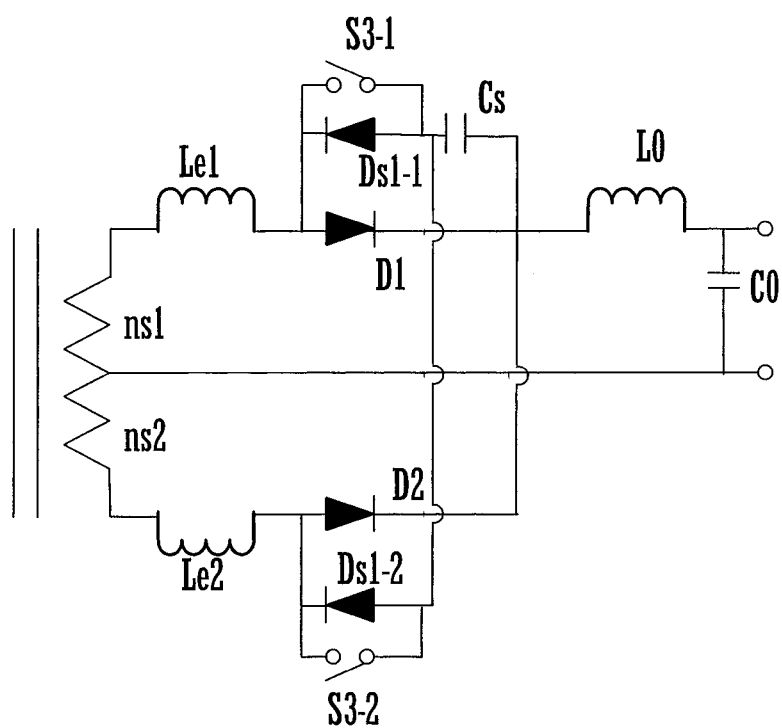
FIG. 4 is a circuit diagram of a DC-DC converter circuit which is yet another embodiment of the present invention.

The way in which this DC-DC converter differs from the converter of FIG. 4 is that it is arranged for only one switching element for regeneration to be used, and for it to be possible to use this switching element for regeneration in common in both the first regeneration snubber circuit and also the second regeneration snubber circuit.

In concrete terms, the structure is as follows.

The anode of a first diode D5 for interference prevention is connected to the point of connection of the anode of the secondary diode D1 and the cathode of the first discharge blocking diode Ds1-1. And the anode of a second diode D6 for interference prevention is connected to the point of connection of the anode of the secondary diode D2 and the cathode of the second discharge blocking diode Ds1-1 [sic]. The cathode of the first diode D5 for interference prevention and the cathode of the second diode D6 for interference prevention are connected together, and the switching element S3 for regeneration is connected between this connection point and the snubber capacitor Cs. The operation of this converter is the same as the operation of the converter shown in FIG. 1.

The DC-DC converters of the various embodiments described above provide the following beneficial effects.

(1) The surge energy which originates due to the secondary diode reverse recovery time during current changeover and due to the leakage inductance between the primary and the secondary of the transformer T is accumulated in the snubber capacitor Cs which is discharged during free wheeling, so that this energy is regenerated to the load, and accordingly the conversion efficiency of the converter is enhanced.

(2) Since it is possible to clamp the secondary diode voltage during current changeover almost to the secondary voltage of the transformer T, accordingly it is possible to employ diodes whose maximum withstand voltage value (Vrrm) is low. Since, with this type of diode, generally also the voltage drop (Vf) in the forward direction is low, and moreover the reverse recovery time (trr) is short, accordingly the loss becomes low. Due to this, it is possible further to improve the conversion efficiency of the converter.

(3) Since no snubber resistor, damping resistor, or discharge resistor is used in the snubber circuit, accordingly it is possible further to improve the conversion efficiency of the converter.

(4) Since no high frequency vibration (ringing) in the secondary diode voltage is generated during current changeover, accordingly the EMI (Electro Magnetic Susceptibility) [sic] characteristic is improved.

(5) Since the discharge of the snubber capacitor Cs is performed during the free wheeling interval t4 through t5 in which all of the secondary diodes D1 through D4 (D1 and D2 in FIGS. 3 through 5) are continuous, and the energy accumulated in the leakage inductance Le is emitted, accordingly the discharge current is not short circuited by the secondary diodes.

The invention claimed is:

1. A DC-DC converter circuit, comprising:
 a switching circuit which switches a DC power supply with two or more primary side switching elements;
 a transformer, to a primary side winding of which the output of said switching circuit is applied, and which outputs a voltage which has been changed by a predetermined voltage change ratio to a secondary side winding;
 a secondary diode circuit including a plurality of secondary diodes for current adjustment, connected to said secondary side winding of said transformer;
 a regeneration snubber circuit connected in parallel with said secondary diode circuit, and including a series circuit of a discharge blocking diode and a snubber capacitor, and a switching element for regeneration connected in parallel with said discharge blocking diode;
 a filter circuit connected between rectification outputs of said secondary diode circuit; and
 a control unit which
  a) turns said switching element for regeneration ON a predetermined time period during which all primary side switching elements are OFF, and
  b) turns said switching element for regeneration OFF during the predetermined time period and prior to a subsequent time period during which any of the primary side switching elements is ON such that the switching element for regeneration is never ON a time period during which any of the primary side switching elements are ON;
 wherein said predetermined time period is set to approximately the time period during which the charge, accumulated in said snubber capacitor due to reverse recovery time when any one of said secondary diodes in said secondary diode circuit has been turned OFF, discharges.

2. A DC-DC converter circuit according to claim 1, wherein said filter circuit consists of a smoothing reactor.

3. A DC-DC converter circuit according to claim 1, wherein said filter circuit consists of a series circuit of a smoothing reactor and a smoothing capacitor.

4. A DC-DC converter circuit according to claim 1, wherein said secondary diode circuit consists of a bridge rectification circuit in which four secondary diodes are bridge connected.

5. A DC-DC converter circuit according to claim 1, wherein:
 said secondary side winding of said transformer is constituted by a winding in which two output terminals and a center tap are provided, said secondary diode circuit is constituted by first and second secondary diodes each of which is connected to one of the two output terminals of said secondary side winding, and said regeneration snubber circuit is constituted by first and second regeneration snubber circuits which are respectively connected in parallel to said first and second secondary diodes;
 said first regeneration snubber circuit includes a series circuit of a first discharge blocking diode and a first snubber capacitor, and a first switching element for regeneration which is connected in parallel with said first discharge blocking diode; and
 said second regeneration snubber circuit includes a series circuit of a second discharge blocking diode and a second snubber capacitor, and a second switching element for regeneration which is connected in parallel with said second discharge blocking diode.

6. A DC-DC converter circuit according to claim 5, wherein said first snubber capacitor and said second snubber capacitor are constituted by a single snubber capacitor.

7. A DC-DC converter circuit according to claim 6, wherein said first switching element for regeneration and said second switching element for regeneration are constituted by a single switching element for regeneration.

* * * * *